United States Patent
Kim et al.

(10) Patent No.: US 7,130,058 B2
(45) Date of Patent: Oct. 31, 2006

(54) SYSTEM AND METHOD FOR DETERMINING COORDINATES ON THREE-DIMENSIONAL SPACE USING BEAM PHASE INTERFERENCE

(75) Inventors: SeungWoo Kim, Daejeon (KR); Hyuggyo Rhee, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 282 days.

(21) Appl. No.: 10/473,589

(22) PCT Filed: May 21, 2002

(86) PCT No.: PCT/KR02/00957

§ 371 (c)(1),
(2), (4) Date: Oct. 9, 2003

(87) PCT Pub. No.: WO02/095326

PCT Pub. Date: Nov. 28, 2002

(65) Prior Publication Data
US 2004/0145746 A1    Jul. 29, 2004

(30) Foreign Application Priority Data
May 22, 2001 (KR) .............................. 2001-27878

(51) Int. Cl.
*G01B 9/02*    (2006.01)

(52) U.S. Cl. .................. 356/511; 356/477; 356/512
(58) Field of Classification Search ............... 356/482, 356/498, 499, 512, 511, 477
See application file for complete search history.

(56) References Cited

U.S. PATENT DOCUMENTS

| 5,995,223 A | 11/1999 | Power |
| 6,208,416 B1* | 3/2001 | Huntley et al. ............. 356/606 |
| 6,297,884 B1 | 10/2001 | Drabarek |

* cited by examiner

*Primary Examiner*—Gregory Toatley
*Assistant Examiner*—Marissa J. Detschel (57) ABSTRACT

Disclosed are a system and a method for determining coordinates of a three-dimensional measurer probe using a beam phase interference method. Two optical fibers are mounted inside the probe, and detecting means obtains an interference pattern generated by beam emitted from a point beam source mounted at ends of the optical fibers. After that, wave front of the interference pattern is measured and a location of the point beam source is determined through a nonlinear optimization from the wave front, and thereby the coordinates of the three-dimensional measurer probe are set. Because the two optical fibers of the inside of the probe to be measured are located in close vicinity to the three-dimensional object, the present measuring system and method can reduce a measurement error, make a structure of the system simple, and thereby reduce a manufacturing cost.

6 Claims, 12 Drawing Sheets

SYSTEM AND METHOD FOR DETERMINING COORDINATES ON THREE-DIMENSIONAL SPACE USING BEAM PHASE INTERFERENCE

TECHNICAL FIELD

The present invention relates to a system and a method for determining coordinates of a three-dimensional measurer probe using a beam phase interference method. Specifically, the invention relates to a system and a method for determining coordinates of a three-dimensional measurer probe in such a manner that two optical fibers are mounted inside the probe, a detector obtains an interference pattern generated by beam emitted from a point beam source set at ends of the optical fibers, wave front of the interference pattern is measured using a phase shift algorithm and a location of the point beam source is determined through a nonlinear optimization from the wave front, thereby determining the coordinates of the three-dimensional measurer probe.

Because the two optical fibers set inside the probe to be measured are located in close vicinity to the three-dimensional object, the measuring system and method of the present invention can reduce a measurement error, make a structure of the system simple, and thereby reduce a manufacturing cost.

BACKGROUND ART

Figure 1:
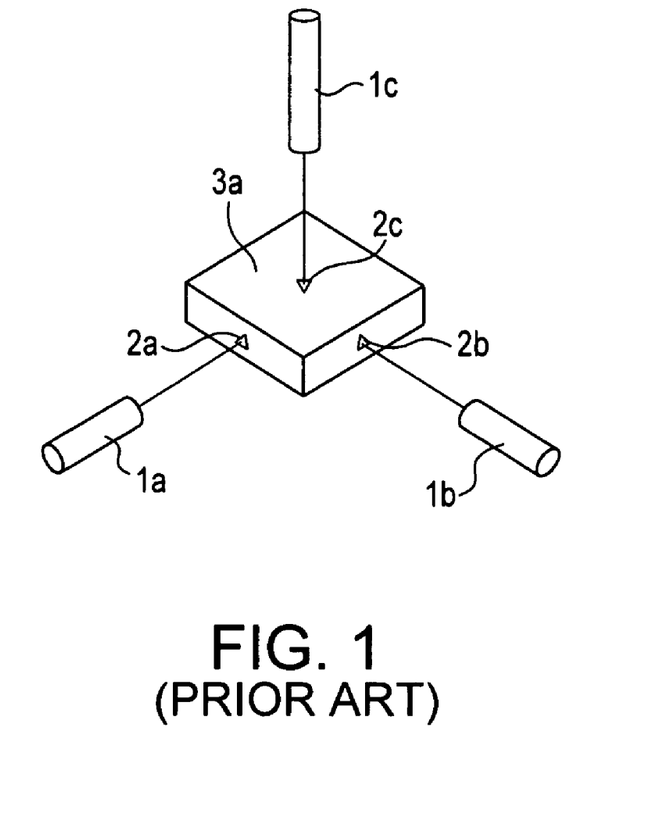
FIG. 1 illustrates the principle of a conventional laser interferometer module for measuring coordinates.

FIG. 1 illustrates a system for determining three-dimensional coordinates using the principle of a laser interferometer. The principle is that laser beams generated from an x-axis laser interferometer 1a, a y-axis laser interferometer 1b and a z-axis laser interferometer 1c are inputted into a probe 3a and interference patterns reflected by corner mirrors 2a, 2b and 2c of the probe are detected to set the three-dimensional coordinates. In this system, the operating range of the probe 3a increases when the volume of an object to be measured is large. In the above-described procedure, the laser interferometers 1a, 1b and 1c are failed to target the ranges of the corner mirrors of the probe so that the coordinate values cannot be measured. In addition, the laser interferometers must move together with the probe as the probe moves and they are costly apparatuses. Thus, a three-dimensional measurer employing the principle of the laser interferometer becomes expensive.

To overcome the aforementioned shortcoming, another system using a laser interferometer (shown in FIG. 1A) is constructed in a manner that x-axis and y-axis reflecting mirrors 2x and 2y reflect interference patterns and z-axis measures a laser interferometer apparatus using the laser interferometer. However, this system should use two laser interferometers and employ reflecting mirrors 2x and 2y, which are perfectly horizontal. Accordingly, the system becomes expensive and the sizes of the reflecting mirrors must be increased when the movement range of the probe is extended.

Figure 1A:
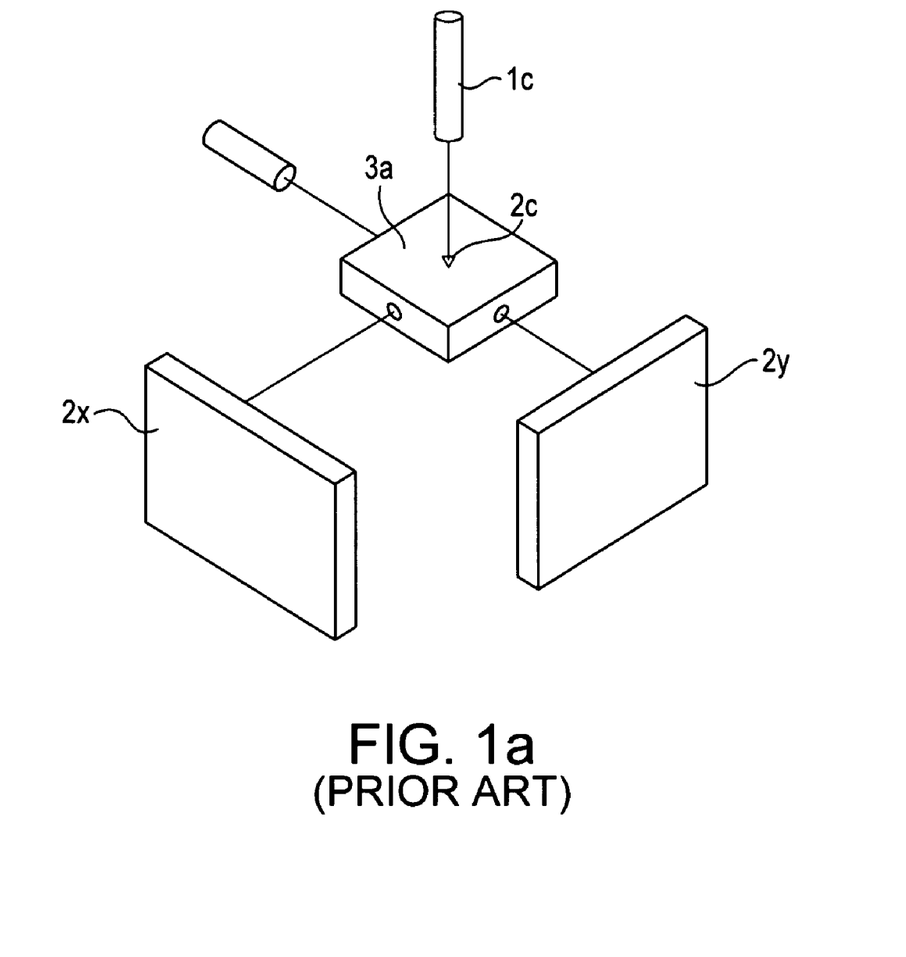
FIG. 1A illustrates the principle of another conventional laser interferometer module for measuring coordinates.
Figure 2:
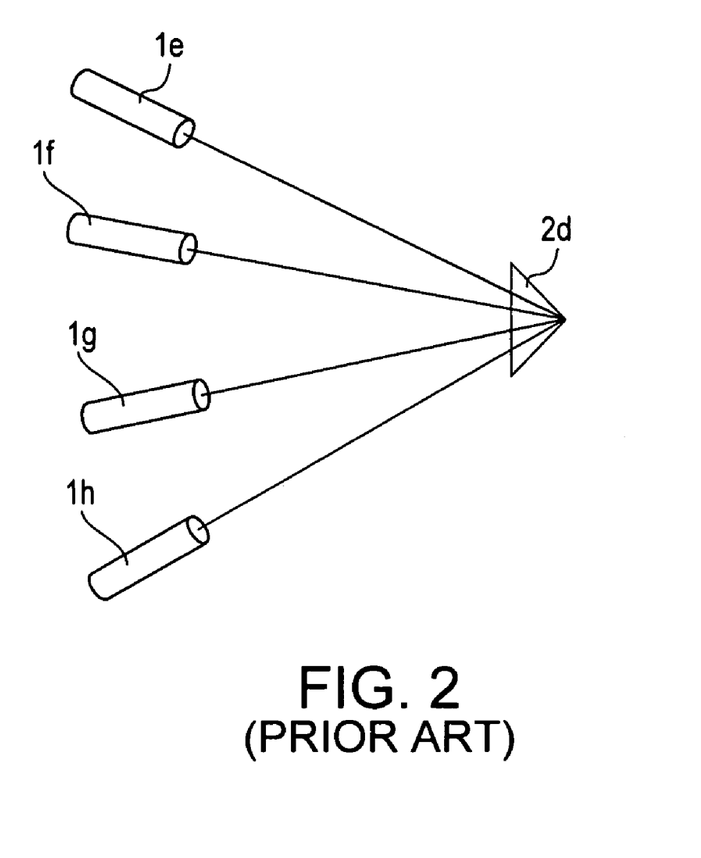
FIG. 2 illustrates the principle of an improved laser interferometer module for measuring coordinates.
Figure 2A:
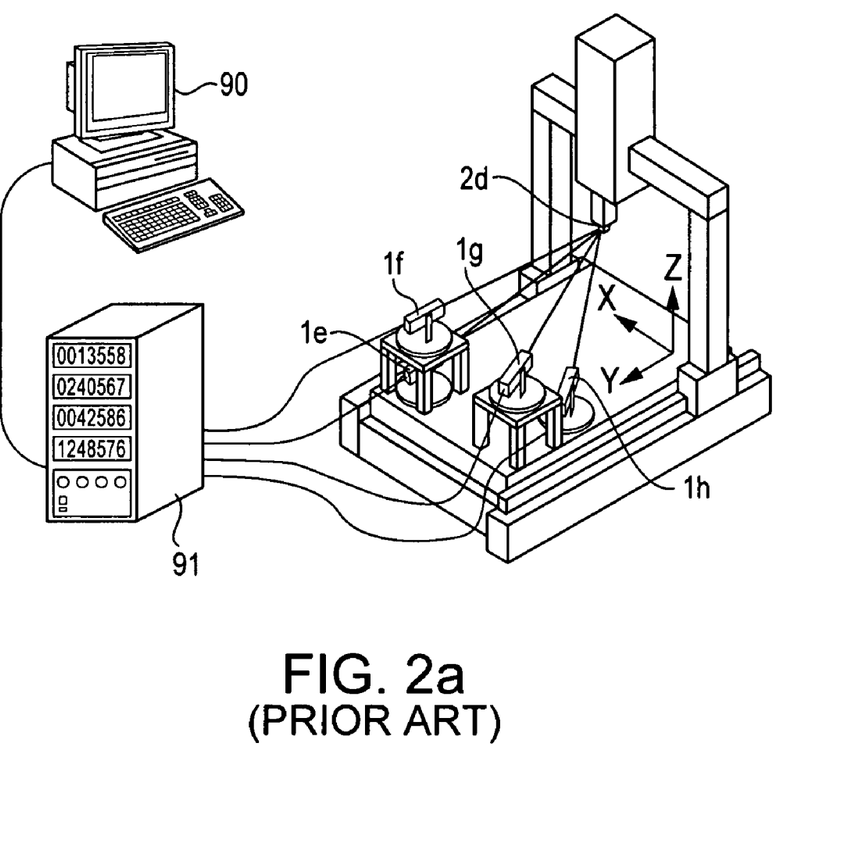
FIG. 2A illustrates a three-dimensional coordinate measuring machine.

FIGS. 2 and 2A illustrate laser interferometers that compensate for the shortcomings of the systems of FIGS. 1 and 1A. Laser interferometers 1e, 1f, 1g and 1h are located irrespective of directions and an interference pattern reflected by a corner mirror 2d set at one side of a probe is detected to measure three-dimensional coordinates. This system includes a controller 91 for setting a position of the probe and a computer 90 for detecting the interference pattern to measure the three-dimensional coordinates. This system is also expensive because it uses four laser interferometers. In addition, the laser interferometers should rotate when the probe is moved.

DISCLOSURE OF INVENTION

An object of the present invention is to provide a new method and system for determining coordinates of a three-dimensional measurer probe.

To accomplish the object of the invention, there are proposed a method and a system for determining coordinates of a three-dimensional probe by placing two optical fibers inside the three-dimensional probe, generating an interference pattern using the optical fibers as a point beam source, and analyzing the interference pattern, thereby determining coordinates of the point beam source in the three-dimensional space.

The present invention analyzes the interference pattern in such a manner that wave front of the interference pattern is measured using a known phase shift algorithm and then a location of the point beam source is determined through a nonlinear optimization from the wave front.

As described above, the optical fibers are simply mounted inside the probe to easily construct the probe apparatus. Accordingly, the optical fibers can be located in close vicinity to an object to be measured through the simple structure so as to reduce a measurement error while decreasing a manufacturing cost.

BEST MODE FOR CARRYING OUT THE INVENTION

The present invention includes a probe in which two optical fibers for emitting beams are set, a detector for detecting an interference pattern generated by the beams emitted from the optical fibers, and a control/analysis unit for analyzing the interference pattern obtained by the detector. Beams, obtained in such a manner that a fiber coupler splits a beam emitted from a single light source, are transmitted through different optical fibers to the two optical fibers set in the probe. One of the two optical fibers is united with a cylindrical PZT, being wound round the PZT, in order to control an optical path. The PZT is connected to the control/analysis unit to control a single optical path.

Figure 3:
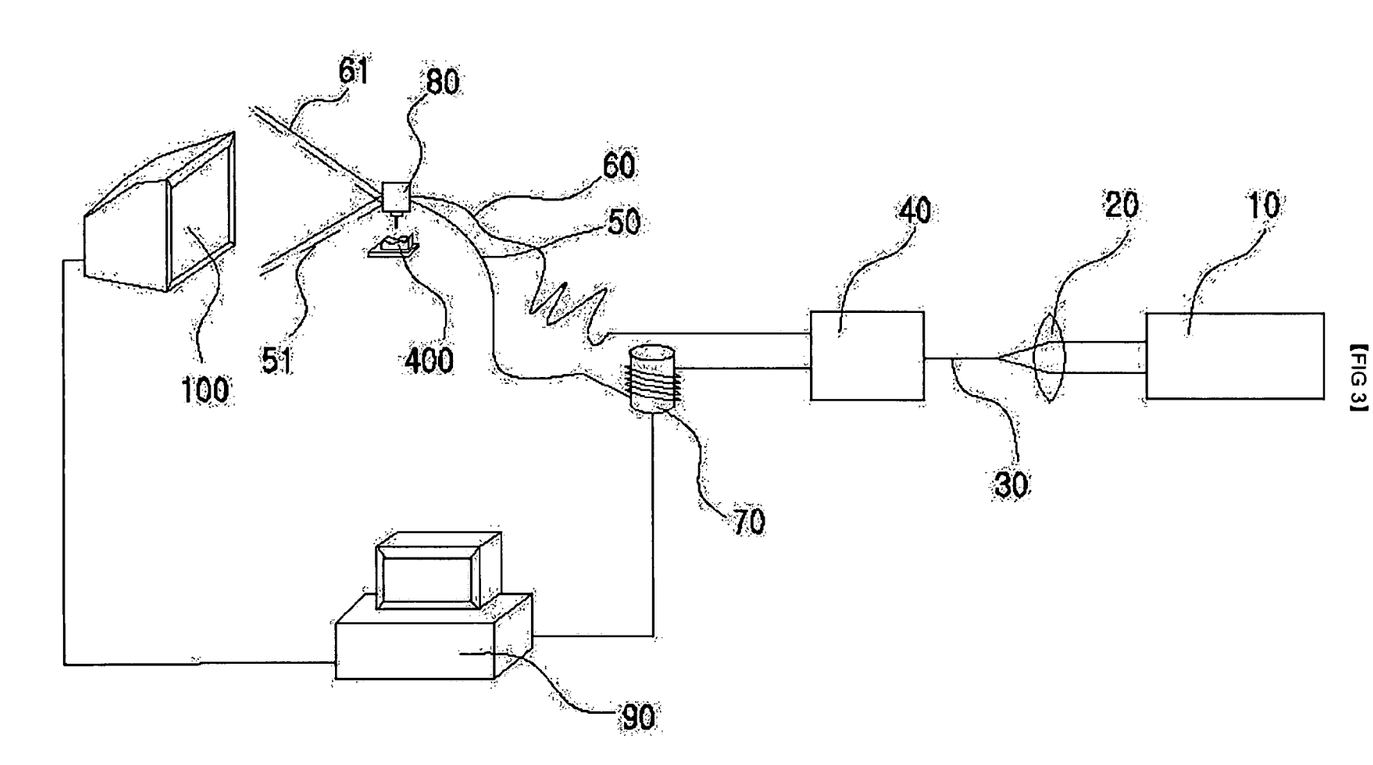
FIG. 3 illustrates an embodiment of a three-dimensional measuring system according to the present invention.

Preferred embodiments of the present invention are explained below with reference to attached drawings. FIG. 3 roughly illustrates the system according to the present invention.

A beam emitted from a light source 10 is inputted into a single-mode fiber 30 through a lens 20 of good performance. The incident beam is split into two beams by a fiber coupler 40 and transmitted through two different optical fibers 50 and 60 to be inputted into a probe 80 (referring FIG. 4). The two optical fibers 50 and 60 have the same length and one of them is wound round a PZT 70 several times and united with the probe 80 so as to change an optical path. The PZT 70 expands when voltage is applied thereto. Thus, when the PZT 70 accepts voltage from a signal sent from a computer 90, it is expended and thus the optical fiber wound round it also lengthens, thereby changing the optical path.

There is explained below a procedure of acquiring coordinates of a point beam source by obtaining the interference pattern from the light source and analyzing it.

When a beam is generated from the light source 10, the beam is inputted into the single-mode optical fiber 30 and then split by the optical fiber coupler 40. The split beams are respectively transmitted through the optical fibers 50 and 60 to the ends of them being inserted into the probe, generating spherical waves. The optical fiber wound round the PZT lengthens as the volume of the PZT expands so that the two optical fibers 50 and 60 respectively generate spherical waves having different phases. These spherical waves having different phases respectively generate interference patterns having different initial phases. An image capturing unit captures the interference patterns and calculates their curvatures using a known phase shift algorithm. A CCD camera is usually used as the image capturing unit and a two-dimensional line camera and a three-dimensional area camera are also used. The camera converts a captured image value into a digital value by pixels. The curvature of each interference pattern can be represented by one central point. If the positions of the optical filters in the probe are not changed as described above, the curvatures of the interference patterns are not varied and the central points representative of the curvatures are fixed to specific positions in the three-dimensional space. Accordingly, the movement of the probe can be determined by setting the traces of the central points of the interference patterns because the trace of the probe's movement in the three-dimensional space is identical to the traces of the central points of the interference patterns.

An object 400 to be measured is placed under the three-dimensional measurer probe and the image capturing unit (CCD camera 100 was used in the present invention) is located in front of the ends of the optical fibers set inside the probe. It is preferable that the CCD camera 100 is placed in front of the spherical wave 61 generated by the optical fiber 60 and the spherical wave 51 generated by the other optical fiber 50. The object 400 to be measured and the CCD camera must be fixed.

To use the known phase shift algorithm, several interference patterns having different initial phases are required. This can be accomplished by controlling voltage applied to the PZT 70 through the control/analysis unit so as to change the optical path of one optical fiber. Generally, the control/analysis unit may include a general computer, an industrial computer specially manufactured for industrial uses, a central control unit and so on. The procedure of changing the optical path using the PZT and thereby obtaining interference patterns to calculate the curvatures of the interference patterns is well known in the art. Thus, detailed explanation about the procedure is omitted in the present invention.

A contact signal generated when a probing needle 81 (referring FIG. 4) set at the bottom of the probe 80 comes into contact with the object 400 to be measured is transmitted to the control/analysis unit, and the image capturing unit obtains several interference patterns having different initial phases on the basis of the contact signal. Though the probing needle 81 described in this embodiment is of contact type, a non-contact type probe can be also employed if an auto-focusing device is introduced in the system. Furthermore, the probing needle can be easily modified on the technical level of those skilled in the art.

Figure 4:
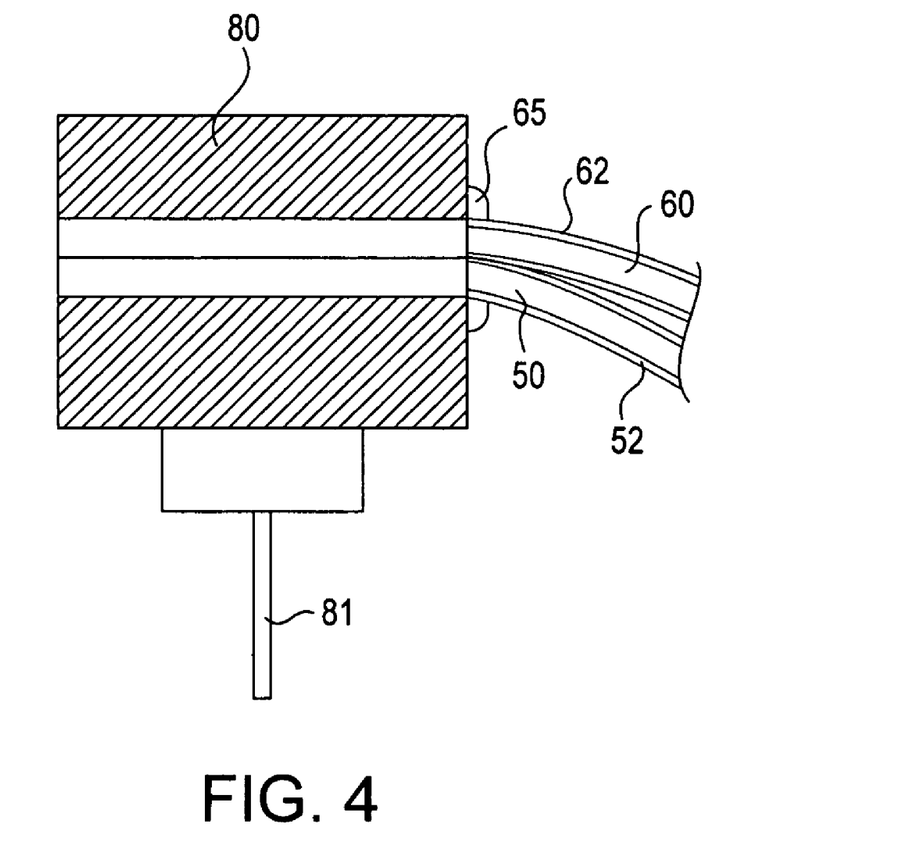
FIG. 4 is a cross-sectional view illustrating the junction of a probe and optical fibers in the system of the present invention.
Figure 4A:
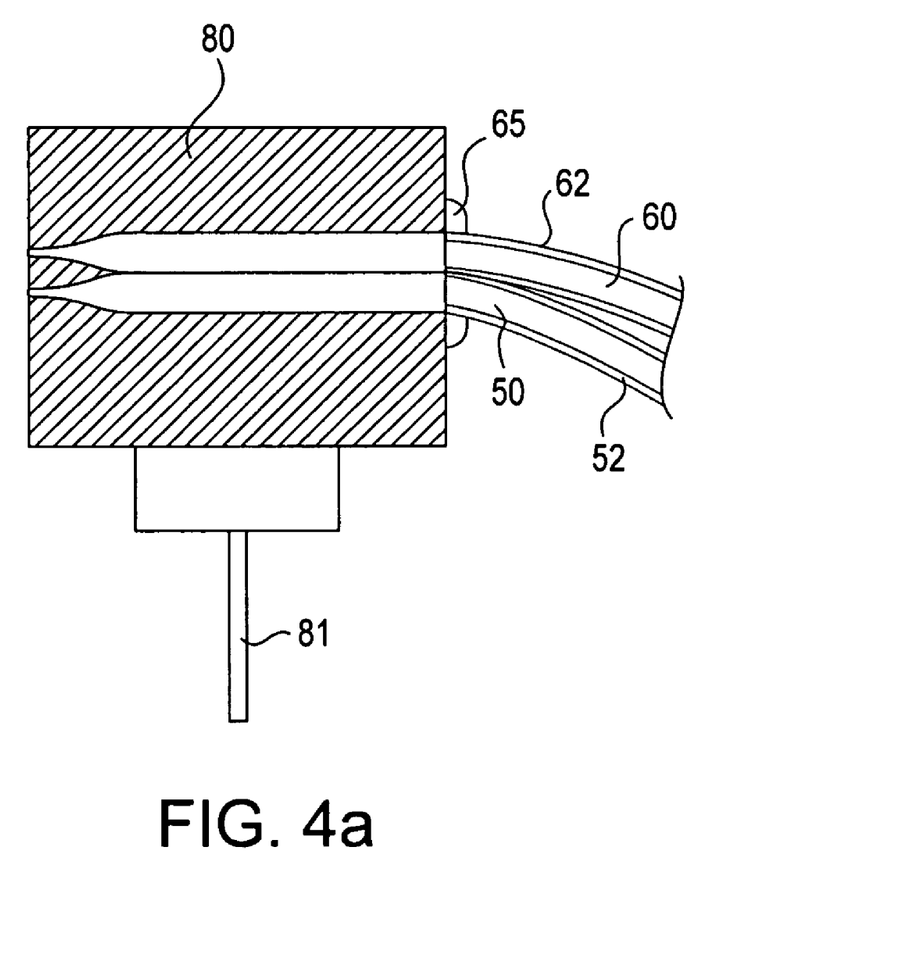
FIG. 4A is a cross-sectional view illustrating another form of the junction of the probe and the optical fibers in the system of the present invention.

FIG. 4 is a cross-sectional view illustrating the junction of the optical fibers and the probe, and FIG. 4A is a cross-sectional view illustrating another form of the junction of the optical fibers and the probe. Covering 62 of a part of the end of each of the optical fibers 50 and 60 is stripped off and cut with the end of each optical fiber and one side of the probe according with each other. A portion of the probe into which the optical fibers are inserted is sealed so that the optical fibers cannot come out. A measurement error can be reduced when the probe and the object to be measured directly come into contact with each other. However, the direct contact is unsuitable when the object is small. Thus, the contact of the probe and the object is made using the probing needle 81. The probe may come into contact with the object through the aforementioned non-contact type probe and the contact method can be varied on the technical level of those skilled in the art. FIG. 4A illustrates another form of the junction of the probe and the optical fibers 50 and 60. When the junction of the probe and the optical fibers is made with the ends of the optical fibers being narrowed, spherical waves generated at the ends of the optical fibers have curvatures larger than those of the spherical waves generated in the structure of FIG. 4. Accordingly, at least two image capturing units (here, CCD camera) are set to measure the curvatures and central points obtained from the curvatures are averaged to determine a central point, resulting in more accurate measurement.

Figure 5:
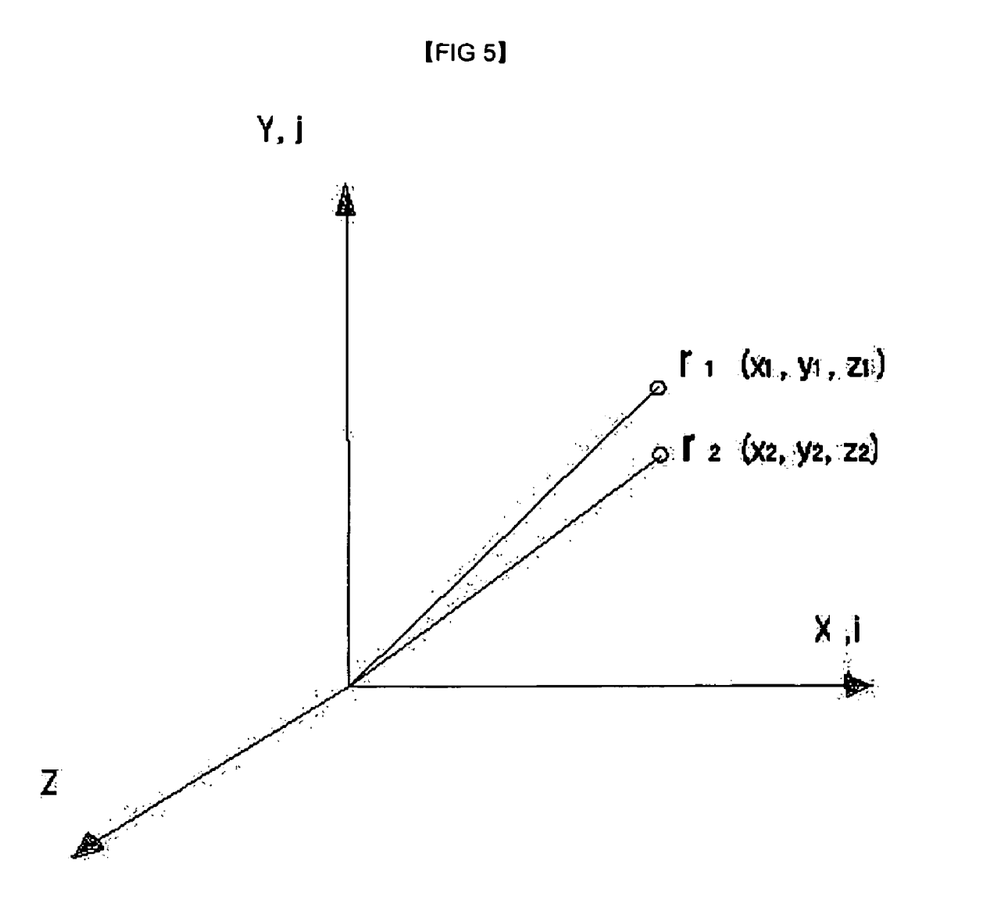
FIG. 5 illustrates a CCD camera and optical fibers in three-dimensional coordinates.

FIG. 5 represents the positions of the CCD camera used as the image capturing unit and the optical fibers 50 and 60 in three-dimensional coordinates.

In case where an orthogonal absolute coordinate system having the center of the CCD camera as the origin is depicted as shown in FIG. 5, the centers of two spherical waves, that is, the central coordinates of the single-mode optical fiber is represented by six unknown quantities of x1, y1, z1, x2, y2 and z2.

A procedure of obtaining the six unknown quantities is explained below. Before the explanation, parameters of equations to be developed are defined as follows.

$I_0$: Light intensity at the center of the CCD camera

A: Amplitude of optical fiber $r_1$: Distance from optical fiber to the center of the CCD camera $r_2$: Distance from optical fiber to the center of the CCD camera $$\Pi: \frac{A_1^2}{r_1^2} + \frac{A_2^2}{r_2^2}$$

$$\Gamma_0: 2\frac{A_1 A_2}{r_1 r_2}$$

Δφ: Initial phase difference of two optical fibers
i, j Pixels deviated from the center of the CCD camera
k: wave number (2π/λ)
$\overline{\Lambda}_{ij}$: Coordinate value according to modeling
$\Lambda_{ij}$: Coordinate value according to measurement
E: Difference between the measured coordinate value and the modeling coordinate value
F: Size of one pixel of the CCD camera (=10 μm)

Two spherical waves, which respectively start from the central coordinates (x1, y1, z1) of the optical fiber 50 and the central coordinates (x2, y2, z2) of the optical fiber 60 in the three-dimensional space and arrive at the center of the CCD, that is, the origin of the coordinate system, are represented as the following equations (1) and (2).

$$u_1 = \frac{A_1}{r_1} e^{-j(kr_1 + \phi_1)}, \text{ where } r_1 = \sqrt{x_1^2 + y_1^2 + z_1^2} \quad \text{(Equation 1)}$$

$$u_2 = \frac{A_2}{r_2} e^{-j(kr_2 + \phi_2)}, \text{ where } r_2 = \sqrt{x_2^2 + y_2^2 + z_2^2} \quad \text{(Equation 2)}$$

In the equations 1 and 2, $\phi_1$ and $\phi_2$ respectively mean initial phases of the ends of the optical fibers 50 and 60. Accordingly, light intensity obtained from the center of the CCD according to the two spherical waves can be represented as follows.

$$I_0 = \frac{A_1^2}{r_1^2} + \frac{A_2^2}{r_2^2} + 2\frac{A_1}{r_1}\frac{A_2}{r_2}\cos[k(r_1 - r_2) + \phi_1 + \phi_2] \quad \text{(Equation 3)}$$

$$= \Pi_0 + \Gamma_0 \cos[k(r_1 - r_2) + \Delta\varphi]$$

Since the size of one pixel of the CCD is 10 μm, light intensity at the point CCD (i, j) in FIG. 5 can be represented as follows.

$$I_{ij} = \frac{A_{1ij}^2}{r_{1ij}^2} + \frac{A_{2ij}^2}{r_{2ij}^2} + 2\frac{A_{1ij}}{r_{1ij}}\frac{A_{2ij}}{r_{2ij}}\cos[k(r_{1ij} - r_{2ij}) + \Delta\phi]$$

$$= \Pi_{ij} + \Gamma_{ij}\cos[k(r_{1ij} - r_{2ij}) + \Delta\phi]$$

where $$r_{1ij} = \sqrt{(x_1 - i \times F)^2 + (y_1 - i \times F)^2 + z_1^2} \quad r_{2ij} =$$
$$\sqrt{(x_2 - i \times F)^2 + (y_2 - i \times F)^2 + z_2^2} \quad F = 10 \text{ μm} \quad \text{(Equation 4)}$$

When the phase of one of the optical fiber is shifted by $\delta_k$ in the equation 4 in order to employ a phase-shifting technique, light intensity is represented as follows.

$$I_{ijk} = \Pi_{ij} + \Gamma_{ij}\cos[k(r_{1ij} - r_{2ij}) + \Delta\phi - \delta_k] \quad \text{(Equation 5)}$$

If light intensity when the quantity of phase shift, $\delta_k$, is zero, that is, before the phase shift is made, is represented as $I_{ij0}$, $P_{ijk}$ can be defined as follows.

$$P_{ijk} = I_{ijk} - I_{ij0} \quad \text{(Equation 6)}$$
$$= \Gamma_{ij}\cos\Phi_{ij}(\cos\delta_k - 1) + \Gamma_{ij}\sin\Phi_{ij}\sin\delta_k$$
$$= C_{ij}(\cos\delta_k - 1) + S_{ij}\sin\delta_k$$

where $\Phi_{ij} = k(r_{1ij} - r_{2ij}) + \Delta\phi$

When an arbitrary phase shift algorithm is introduced into the equation 6, phase $\Phi_{ij}$ can be obtained irrespective of the quantity of phase shift $\delta_k$.

When the phase $\Phi_{ij}$ is acquired in the equation 6, seven unknown quantities x1, y1, z1, x2, y2, z2 and ΔΦ are included therein. Accordingly, from a new phase difference obtained by subtracting phase $\Phi_{00}$ from the phase $\Phi_{ij}$ in the CCD central coordinates (i=0, j=0), $\Lambda_{ij}$ is defined as follows.

$$\Lambda_{ij} = \frac{\Phi_{ij} - \Phi_{00}}{k} = r_{1ij} - r_{2ij} - r_{100} - r_{200} \quad \text{(Equation 7)}$$

As described above, $\Lambda_{ij}$ is represented by the six unknown quantities x1, x1, z1, x2, y2 and z2. Therefore, an object function to be minimized is defined as follows.

$$E = \sum_{i,j}(\Lambda_{ij} - \overline{\Lambda}_{ij})^2 \quad \text{(Equation 8)}$$

Here, $\overline{\Lambda}_{ij}$ means the measurement value of $\Lambda_{ij}$, and $$\sum_{i,j}$$

means that $(\Lambda_{ij} - \overline{\Lambda}_{ij})^2$ is summed for CCD pixels. Because the object function defined as above is convex, its convergence is guaranteed but it is nonlinear for the six unknown quantities. Accordingly, nonlinear optimization is required.

The nonlinear optimization needs two algorithms for determining a direction and a step size, and these two algorithms are repeatedly executed to obtain an optimal position.

The present invention uses the modified Newton's method, which is a stable nonlinear optimization with high convergence speed, as the algorithm for determining a direction. The modified Newton's method has a fast convergence speed because it quadratic-converges, and it is suitable for solving approximately six unknown quantities. BFGC used in the present invention is the algorithm whose performance was verified in various ways and widely being employed in the academic world. The algorithm for determining a size includes Armijo method that is fast, Trust region method and quadratic fitting method with high accuracy. The present invention uses the Armijo method in a region near the initial position and uses the quadratic fitting method in a region close to the optimal position so as to improve optimization performance, thereby meeting a given problem.

The speed of the optimization algorithm of obtaining the six unknown quantities described above depends on how close the initial position is assumed to be placed to the optimal position. Therefore, the invention uses the following additional items in order to access the initial position more systematically.

In the equation 6, Taylor progression of the phase $\Lambda_{ij}$ is developed for i and j as follows.

$$\Lambda_{ij} = \Lambda_{ij} = \left. \begin{array}{l} + \frac{\partial \Lambda_{ij}}{\partial i} \bigg|_{\substack{i=0 \\ j=0}} i + \frac{\partial \Lambda_{ij}}{\partial j} \bigg|_{\substack{i=0 \\ j=0}} j + \\ \frac{\partial^2 \Lambda_{ij}}{\partial i j} \bigg|_{\substack{i=0 \\ j=0}} ij + \frac{1}{2} \frac{\partial^2 \Lambda_{ij}}{\partial i^2} \bigg|_{\substack{i=0 \\ j=0}} i^2 + \cdots \end{array} \right. \quad \text{(Equation 9)}$$

Meanwhile, when Zernike polynomial is applied to the obtained positive $\overline{\Lambda}_{ij}$, it is represented by the following equation 10.

$$\Lambda_{ij} = \sum_n a_n Z_n(i, j) \quad \text{(Equation 10)}$$

Here, $Z_0=1$, $Z_1=i$, $Z_2=j$, $Z_3=2_{ij}$, ...

Where the equations 9 and 10 are compared with each other, Zernike factors are represented as the following equations 11, 12 and 13 when they are given physical meanings.

$$a_1 = \frac{\partial \Lambda_{ij}}{\partial i}\bigg|_{\substack{i=0 \\ j=0}} = \frac{x_2}{r_{200}} - \frac{x_1}{r_{100}} \quad \text{(Equation 11)}$$

$$a_2 = \frac{\partial \Lambda_{ij}}{\partial j}\bigg|_{\substack{i=0 \\ j=0}} = \frac{y_2}{r_{200}} - \frac{y_1}{r_{100}} \quad \text{(Equation 12)}$$

$$a_3 = \frac{1}{2}\frac{\partial \Lambda_{ij}}{\partial ij}\bigg|_{\substack{i=0 \\ j=0}} = \frac{1}{2}\frac{x_2 y_2}{r_{200}^3} - \frac{x_1 y_1}{r_{100}^3} \quad \text{(Equation 13)}$$

The equations 11, 12 and 13 are arranged as follows.

$$r_{200} = \frac{\left(a_1 + \frac{x_1}{r_{100}}\right)\left(a_2 + \frac{y_1}{r_{100}}\right)}{2a_3 + \frac{x_1 y_1}{r_{100}}} \quad \text{(Equation 14)}$$

$$= \frac{\left(a_1 + \frac{x_1}{\sqrt{x_1^2 + y_1^2 + z_1^2}}\right)}{2a_3 + \frac{x_1 y_1}{(x_1^2 + y_1^2 + z_1^2)^{3/2}}}$$

$$x_2 = r_{200}\left(a_1 + \frac{x_1}{\sqrt{x_1^2 + y_1^2 + z_1^2}}\right)$$

$$y_2 = r_{200}\left(a_1 + \frac{y_1}{\sqrt{x_1^2 + y_1^2 + z_1^2}}\right)$$

$$z_2 = \sqrt{r_{200}^2 - x_2^2 - y_2^2}$$

If the initial positions x1, y1 and z1 are assumed, therefore, x2, y2 and z2 can be obtained through the equation 14 from the measured Zernike factors. Because the initial positions are assumed values, x2, y2 and z2 obtained through the equation 14 are also deviated from the optimal position. However, values closer to the optimal position can be acquired, compared to the case of assuming all of the six unknown quantities, so that it is possible to reach the optimal position with a small number of times of repetition.

When the nonlinear optimization is performed through a simulation as described above, if an initially set value of less than ±100 μm is given to the six unknown quantities in a hexahedron of 150 nm, convergence occurs within the optimal position of 10 nm within 0.98 sec. According to the above-described method, the measurement value ($\overline{\Lambda}_{ij}$) according to the initial modeling can approximate to the actually measured value ($\Lambda_{ij}$) resulting in fast calculation and reduction in errors of measured coordinate values.

Figure 6:
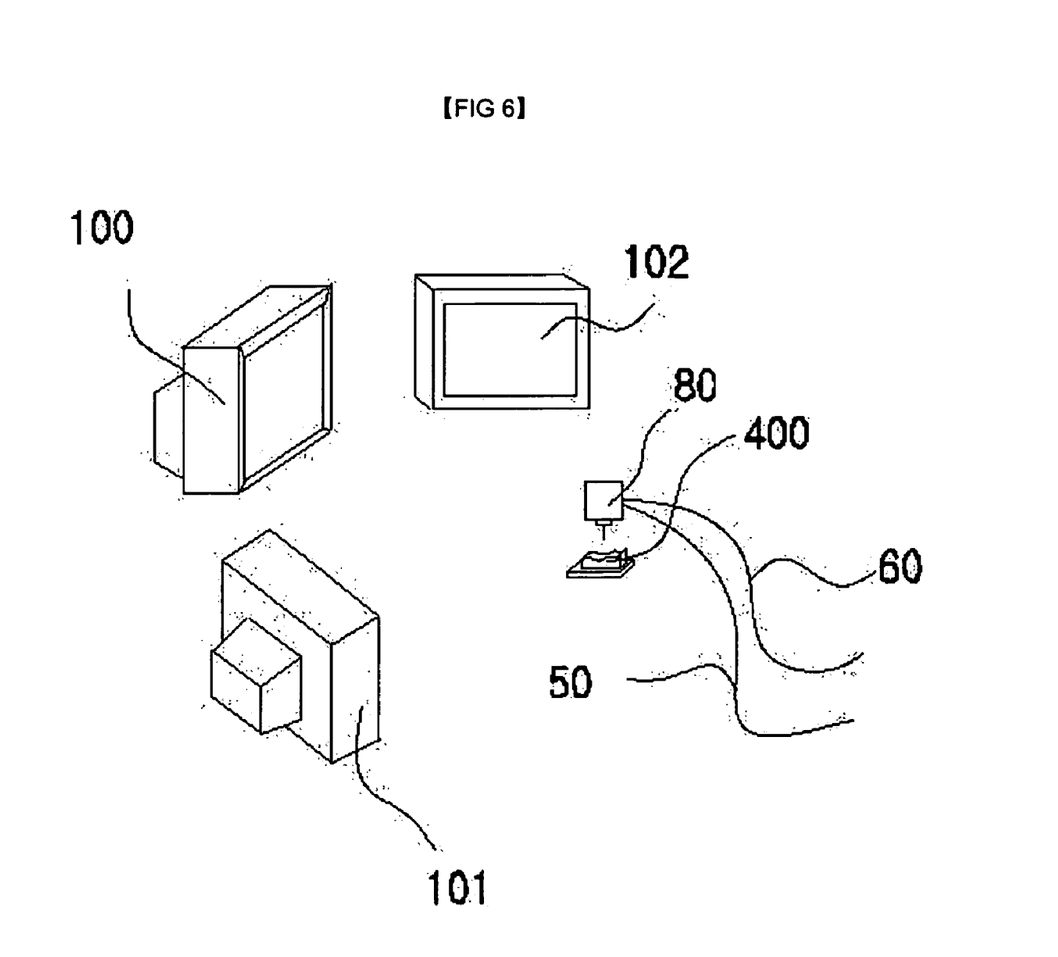
FIG. 6 illustrates an embodiment of the system of the invention in which the number of CCD cameras is increased.

FIG. 6 illustrates an embodiment of measuring interference patterns using at least three CCD cameras in case where the optical fibers are connected with the probe in the manner shown in FIG. 4 or 4A. Though at least three CCD cameras can be set for the optical fibers connected with the probe in the form of FIG. 4, it is preferable to set at least three CCD cameras for the probe in the form of FIG. 4A, which can generate wider spherical wave. The reason why at least three cameras are set is that interference patterns can be measured irrespective of the height of the object to be measured because spherical wave can be detected from other sides in case where the object to be measured is higher than the probe. Furthermore, at least three interference patterns inputted from at least three CCD cameras are detected and the average curvature of curvatures of the detected interference patterns is obtained so that more accurate measurement can be made. The procedure of obtaining the average curvature includes arithmetic average and so on and explanation therefore is omitted in the present invention.

Figure 7:
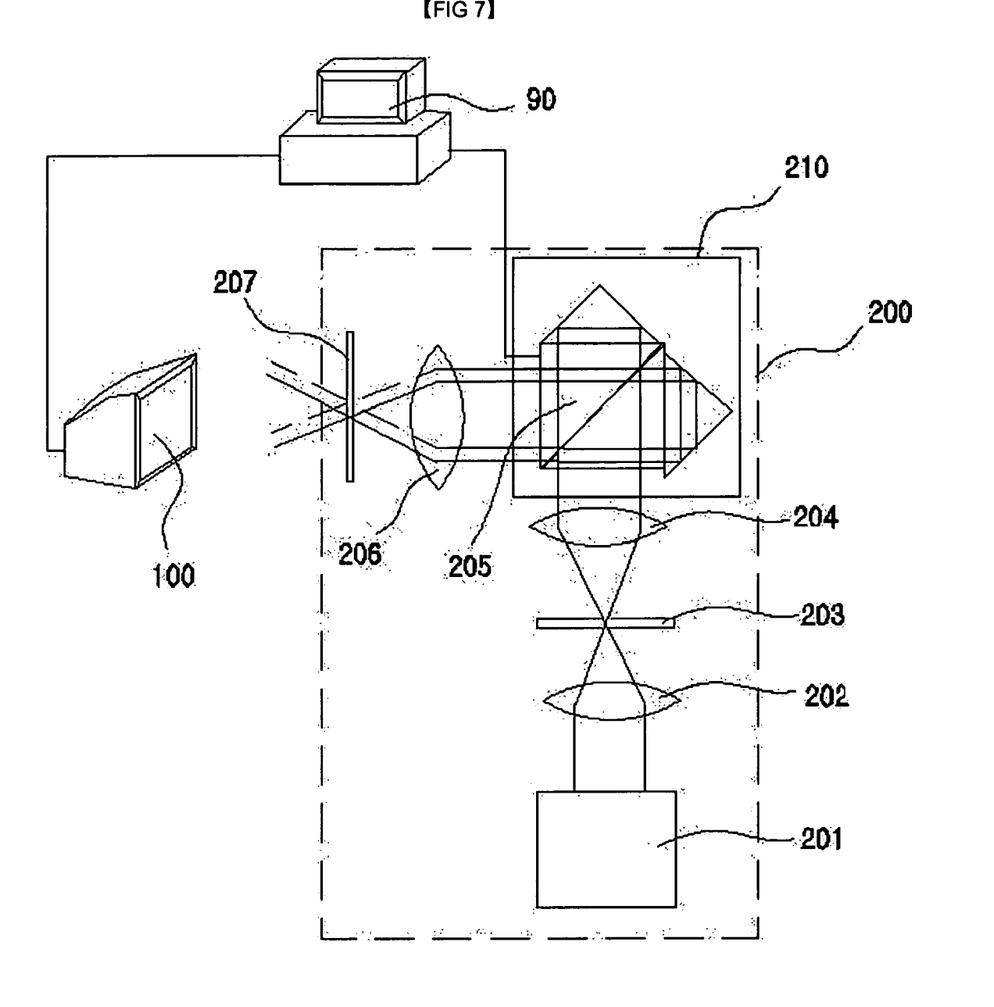
FIG. 7 illustrates another embodiment of the system of the invention using pin-holes.

FIG. 7 illustrates another system for generating spherical waves. A lateral shearing interferometer (LSI) 200 is a device of generating two spherical waves having different phases. Beam is generated from an inner light source 201 and passes through a lens 202, a one-pin hole 203 and a lens 204, and two waves having different phases are generated from the beam through a lateral shearing unit 210 and pass through a lens 206 and a two-pin hole 207 having two holes, thereby generating two spherical waves. In this procedure, power supplied by the computer 90 controls a PZT 205 inside the LSI 200 to create two spherical waves having different phases. This is included in the technical fields of prior arts so that detailed explanation for the LSI is omitted. Since two spherical waves having different phases can be generated even with the aforementioned technique, interference patterns can be obtained using the spherical waves. Furthermore, three-dimensional coordinates of an object to be measured can be extracted by placing the object under the LSI.

Figure 8:
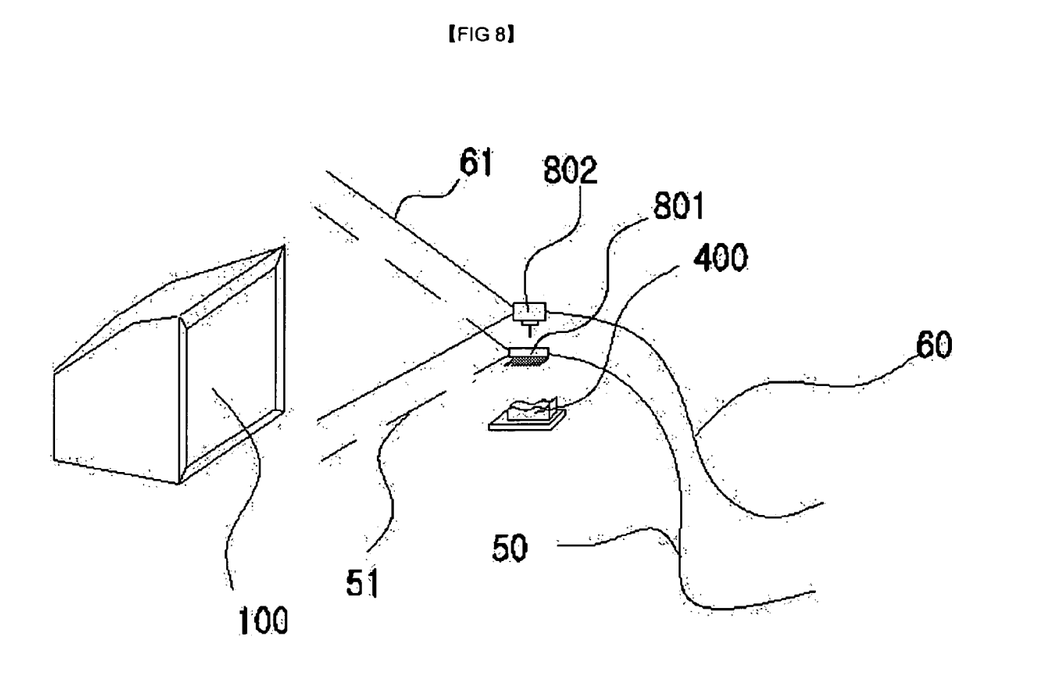
FIG. 8 illustrates another embodiment of the system of the invention, suitable for a narrow space.

FIG. 8 illustrates another form of the probe that can be used in a narrow space. In case of a small measurement range, that is, tens to hundreds micrometers (for example, STM, AFM and the like), one of the optical fibers is fixed and measurement is carried out through an interface pattern generated by moving the other optical fiber in order to measure and correct three-dimensional coordinates of a moving probe. Specifically, the optical fiber 50 is fixed to a fixed probe 801 and a moving probe 802 is moved to measure the interference pattern with the CCD camera 100 so as to extract coordinate values. Here, the fixed probe 801 has a fixed coordinate value so that it can be calculated having $r_1$ or $r_2$ in the equations 1 and 2 used for extracting coordinate values as an initial value. This simplifies entire equations. Accordingly, extraction of only the coordinate value of the moving probe 802 is required, which is allowable when the probe is moved within a narrow space.

Figure 9:
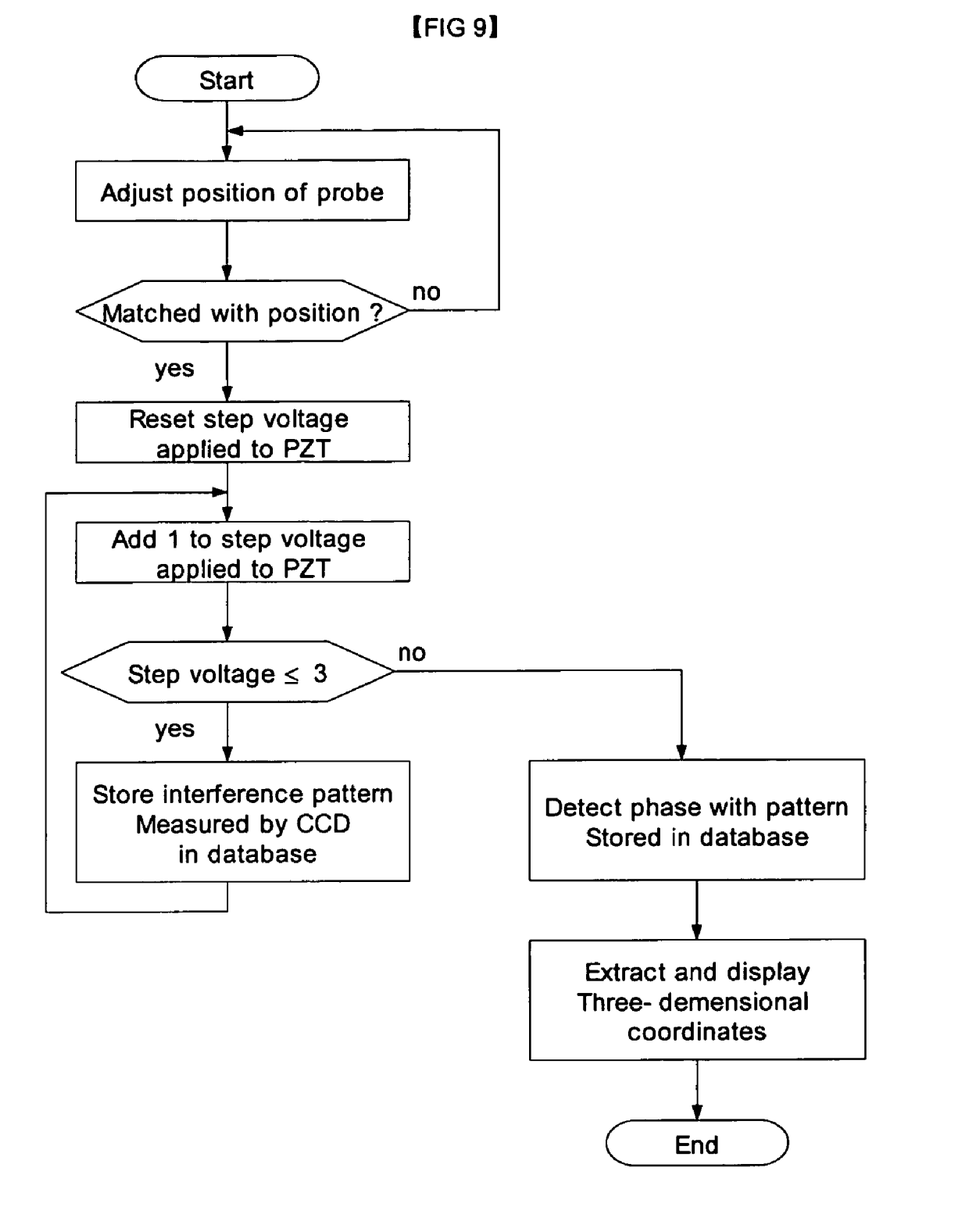
FIG. 9 is a flow chart illustrating a step of applying voltage to PZT according to the present invention.

FIG. 9 is a flow chart showing a procedure of measuring a three-dimensional position according to the present invention. In the present invention, the three-dimensional position is measured using interference patterns measured with voltage generated from a computer, being divided into three steps.

The procedure includes a first step of adjusting a position of the probe, a second step of judging matching of the position of the probe, a third step of resetting steps of voltage applied to the PZT when the probe position is matched, a fourth step of adding 1 to the steps of the voltage applied to the PZT, a fifth step of judging if the steps of the voltage applied to the PZT exceeds 3, a sixth step of detecting interference patterns to obtain coordinates and storing the detected coordinates in a database, and a seventh step of displaying and storing three-dimensional coordinates of x1, y1, z1 or x2, y2, z2 when the steps of the voltage applied to the PZT exceeds 4. When voltages having different levels are applied to the PZT three times at coordinates of a fixed position of the probe to correct the position through generation and detection of interference patterns, more accurate measurement can be accomplished. Though the voltages are applied to the PZT three times to measure the interference patterns in this embodiment, the number of voltages having different levels applied to the PZT is usually equal to 30-40 in actual measurement experiments. Thus, the steps of the aforementioned procedure can be increased or decreased on the technical level of those skilled in the art.

What is claimed is:

1. A system for determining coordinates in a three-dimensional space using a beam phase interference method, comprising:
   a light source that provides a beam to two optical fibers, a first end of each of said two optical fibers being set inside a probe, the probe being placed in the three-dimensional space;
   a fiber coupler positioned proximate a front of said light source that splits said beam emitted from said light source into two beams, a second end of each of said two optical fibers being connected to said fiber coupler, one of said two optical fibers being connected with a PZT that changes an optical path;
   an image capturing unit that acquires an interference pattern generated by beams emitted from said two optical fibers set inside the probe; and
   a control/analysis unit that calculates an acquired interference pattern to determine a curvature and a central point of the interference pattern.

2. A system for determining coordinates in a three-dimensional space using a beam phase interference method, comprising:
   a light source that provides a beam to two optical fibers, a first end of a first optical fiber of said two optical fibers being set inside a probe, the probe being placed in the three-dimensional space, a first end of a second optical fiber of said two optical fibers being fixed to a fixing member;
   a fiber coupler positioned proximate a front of said light source that splits a beam emitted from the light source into two beams, a second end of said first optical fiber and a second end of said second optical fiber being connected to said fiber coupler, one of said two optical fibers being connected with a PZT that changes an optical path;
   an image capturing unit that acquires an interference pattern generated by beams emitted from the optical fiber set inside the probe and the optical fiber fixed to the fixing member; and
   a control/analysis unit that calculates an acquired interference pattern to determine a curvature and a central point of the interference pattern.

3. The system for determining coordinates in a three-dimensional space using a beam phase interference method as claimed in claim 1, wherein the image capturing unit includes a plurality of CCD cameras, and calculates interference patterns captured by at least two CCD cameras to obtain said curvatures and said central points of the interference pattern.

4. A method for determining coordinates in a three-dimensional space, comprising:
   generating spherical waves from two point beam sources;
   forming an interference pattern in response to the spherical waves interfering with each other;
   changing a phase of one of the two point beam sources;
   forming a second interference pattern in response to the point beam source whose phase was changed interfering with the other point beam source;
   obtaining interference patterns having different initial phases through a single image capturing unit, the interference patterns being formed by repeating the changing of the phase of one of the two point beam sources and the forming of the second interference pattern;
   obtaining curvatures of the obtained interference patterns using a phase shift algorithm;
   obtaining central points from the curvatures; and
   determining the obtained central points as coordinates in the three-dimensional space.

5. A method for determining coordinates in a three-dimensional space, comprising:
   generating spherical waves from two point beam sources;
   forming an interference pattern in response to the spherical waves interfering with each other;
   changing a phase of one of the two point beam sources;
   forming another interference pattern in response to the point beam source whose phase was changed interfering with the other point beam source;
   obtaining interference patterns having different initial phases through at least two image capturing units, the interference patterns being formed by repeating the changing of the phase of one of the two beam point sources and the forming of the another interference pattern;
   obtaining curvatures of the interference patterns obtained through at least two image capturing units using a phase shift algorithm;
   averaging the curvatures to obtain one curvature;
   acquiring a central point from the obtained curvature; and
   determining the obtained central point as coordinates in the three-dimensional space.

6. The system for determining coordinates in a three-dimensional space using a beam phase interference method as claimed in claim 2, wherein the image capturing unit for acquiring the interference pattern includes a plurality of CCD cameras, and calculates interference patterns captured by at least two CCD cameras to obtain curvatures and central points of the interference patterns.

* * * * *